United States Patent
Yasuda et al.

(10) Patent No.: US 10,114,385 B2
(45) Date of Patent: Oct. 30, 2018

(54) FLUID CONTROL VALVE

(71) Applicant: HORIBA STEC, Co., Ltd., Kyoto-shi, Kyoto (JP)

(72) Inventors: Tadahiro Yasuda, Kyoto (JP); Shigeyuki Hayashi, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 14/894,932

(22) PCT Filed: Oct. 15, 2014

(86) PCT No.: PCT/JP2014/077464
§ 371 (c)(1),
(2) Date: Nov. 30, 2015

(87) PCT Pub. No.: WO2015/060176
PCT Pub. Date: Apr. 30, 2015

(65) Prior Publication Data
US 2016/0124439 A1 May 5, 2016

(30) Foreign Application Priority Data
Oct. 21, 2013 (JP) .................................. 2013-218744

(51) Int. Cl.
*F16K 11/07* (2006.01)
*G05D 7/06* (2006.01)
(Continued)

(52) U.S. Cl.
CPC ............... *G05D 7/06* (2013.01); *F16K 27/02* (2013.01); *F16K 31/007* (2013.01); *F16K 47/08* (2013.01); *G05D 7/01* (2013.01)

(58) Field of Classification Search
CPC ... F16K 31/007; F16K 47/08; F02M 61/1853; G01F 1/40; G05D 7/06
(Continued)

(56) References Cited

U.S. PATENT DOCUMENTS 4,004,613 A * 1/1977 Purton .................... F16K 47/08
137/625.3
4,162,784 A * 7/1979 Legille .................... C21B 7/005
251/127

(Continued)

FOREIGN PATENT DOCUMENTS

| CN | 101360941 A | 2/2009 |
| JP | S60151486 A | 8/1985 |

(Continued)

OTHER PUBLICATIONS

ISA Japanese Patent Office, International Search Report Issued in Application No. PCT/JP2014/077464, dated Jan. 20, 2015, WIPO, 4 pages.

(Continued)

*Primary Examiner* — Reinaldo Sanchez-Medina
(74) *Attorney, Agent, or Firm* — Alleman Hall Creasman & Tuttle LLP (57) ABSTRACT

To provide a fluid control valve that enables the internal volume to be reduced and, for example, the falling response performance to be improved without compromising the accuracy in controlling a pressure, a flow rate, and so on of fluid, a fluid control valve includes a valve seat portion, a valve body capable of making or breaking contact with the valve seat portion, a fluid resistance, and a pair of clamping members that clamps the fluid resistance. The fluid resistance and the pair of clamping members form an in-valve space in which the valve body or at least part of an actuation member that moves the valve body is housed. Fluid passes (Continued)

through the fluid resistance from the downstream-side in-valve space and flows out to the outside.

7 Claims, 3 Drawing Sheets

(51) Int. Cl.
*F16K 31/00* (2006.01)
*F16K 27/02* (2006.01)
*F16K 47/08* (2006.01)
*G05D 7/01* (2006.01)

(58) Field of Classification Search
USPC .......................... 137/601.18, 625.33, 625.48
See application file for complete search history.

(56) References Cited

U.S. PATENT DOCUMENTS

| | | | | |
|---|---|---|---|---|
| 4,397,331 A * | 8/1983 | Medlar | ................... | F16K 47/02 137/375 |
| 4,407,327 A * | 10/1983 | Hanson | ................... | F16K 47/08 137/625.3 |
| 4,458,718 A * | 7/1984 | Vick | ................... | F16K 11/0712 137/505 |
| 4,666,126 A * | 5/1987 | Tujimura | ................... | F16K 1/34 251/282 |
| 5,582,208 A * | 12/1996 | Suzuki | ................... | F16K 1/34 137/625.29 |
| 6,766,969 B2 * | 7/2004 | Haltiner, Jr. | ......... | F02M 51/061 239/533.12 |
| 6,926,032 B2 * | 8/2005 | Nawaz | ................... | F16K 47/04 137/625.33 |
| 2010/0294964 A1 * | 11/2010 | Matsumoto | ............... | F16K 7/14 251/129.01 |
| 2012/0273061 A1 * | 11/2012 | Hidaka | ................... | F16K 7/14 137/334 |
| 2013/0048898 A1 * | 2/2013 | Hayashi | ................. | F16K 47/00 251/337 |

FOREIGN PATENT DOCUMENTS

| | | |
|---|---|---|
| JP | 11194833 A | 7/1999 |
| JP | H11265217 A | 9/1999 |
| JP | 2000075931 A | 3/2000 |
| JP | 2003316442 A | 11/2003 |
| JP | 2004515831 A | 5/2004 |
| JP | 2006155133 A | 6/2006 |
| JP | 2007048130 A | 2/2007 |
| JP | 2007531931 A | 11/2007 |
| JP | 2011090405 A | 5/2011 |
| WO | 0184029 A1 | 11/2001 |
| WO | 2005086643 A2 | 9/2005 |

OTHER PUBLICATIONS

State Intellectual Property Office of the People's Republic of China, Office Action and Search Report Issued in Application No. 201480023273.6, dated Jun. 22, 2018, 10 pages.

* cited by examiner

FIG.3

FLUID CONTROL VALVE

TECHNICAL FIELD

The present invention relates to a fluid control valve to be used to control a flow rate or pressure of fluid.

BACKGROUND ART

When a flow rate of fluid is to be controlled, a plurality of fluid control instruments are provided separately in a channel so as to constitute a flow rate control device. For example, a pressure-type flow rate control device that controls the flow rate of fluid with a sonic nozzle includes a fluid control valve, a pressure sensor, and a restriction mechanism serving as a fluid resistance, which are provided separately in this order from the upstream side in a channel. In such a pressure-type flow rate control device, the opening of the fluid control valve is controlled on the basis of a measured value of the pressure sensor such that pressures across the restriction mechanism serving as the fluid resistance are at the critical pressure ratio or lower.

A restriction mechanism used in such a pressure-type flow rate control device may include, aside from a restriction, a valve body and an actuator for actuating the valve body. A restriction mechanism disclosed in Patent Literature 1 includes a restriction block that includes an inner channel provided with an orifice and a needle serving as a valve body for regulating the inner diameter of a constricted portion of the orifice. Meanwhile, a restriction mechanism disclosed in Patent Literature 2 includes a main body block provided with an inner channel, a nozzle block mounted so as to fit in the inner channel, and a valve seat that is a valve body capable of making or breaking contact with a downstream-side opening of the nozzle block and that prevents gas from the downstream side from flowing backward when being closed.

In the above-described flow rate control device, the fluid control valve, the pressure sensor, and the restriction mechanism are provided separately from one another in the channel, which requires an internal volume in the flow rate control device corresponding to the space for a channel for connecting the respective instruments. As the internal volume inside the flow rate control device increases, so does the amount of fluid that remains in the internal volume when, for example, the valve is fully closed so as not to flow the fluid. Consequently, it takes more time for the flow rate of the fluid to become substantially zero after the valve is fully closed.

Therefore, in consideration of improving the falling response performance of the flow rate control device, the instruments are conventionally disposed as close as possible to one another so that the channel for connecting the instruments can be made narrow and short in order to reduce the internal volume.

However, if the channel for connecting the respective instruments is too narrow and too short, there arises a possibility that an unintended pressure loss occurs at a portion other than the fluid resistance, which may deteriorate an accuracy in the flow rate control, for example. Thus, it has been difficult to form a channel within a certain size of an internal volume.

And if the internal volume inside the fluid control valve or the restriction mechanism constituting the flow rate control device is reduced in order to improve the falling response performance, for example, a similar problem to the one described above may occur. In particular, because such restriction mechanism is not constructed for the purpose of reducing the internal volume, an extreme reduction of the internal volume may destroy a function as the restriction mechanism to a large extent.

CITATION LIST

Patent Literature a. Patent Literature 1: JP11-265217A
b. Patent Literature 2: JP2000-75931A

SUMMARY OF INVENTION

Technical Problem

The present invention has been made in view of the above-described problems, and an object of the present invention is to provide a fluid control valve that can reduce the internal volume without compromising the accuracy in a pressure control and a flow rate control of the fluid thereby improving, for example, the falling response performance.

Solution to Problem

Specifically, a fluid control valve according to the present invention includes a valve seat portion, a valve body capable of making or breaking contact with the valve seat portion, a fluid resistance, and a pair of clamping members that clamps the fluid resistance. The fluid resistance and the pair of clamping members define an in-valve space in which the valve body or at least part of an actuation member that moves the valve body is housed. Fluid passes through the fluid resistance from the in-valve space and flows out to an outside, or the fluid passes through the fluid resistance from the outside and flows into the in-valve space.

With this configuration, since the fluid control valve is provided with the fluid resistance, it is not required to provide a separate fluid resistance in a flow rate control device, outside the fluid control valve in order to produce a pressure difference for the purpose of measuring, for example, a flow rate. In other words, since there is no need to provide a channel for connecting respective instruments because the fluid resistance outside the fluid control valve is not necessary, it is possible to cut the volume of the channel.

Furthermore, it is possible to dispose the fluid resistance in the channel inside the fluid control valve at a position in the vicinity of an outlet or an inlet for the fluid, rather than at a position midway of the channel, because it is configured that the fluid resistance and the pair of clamping members form the in-valve space in which the valve body or at least part of the actuation member that moves the valve body is housed, and that the fluid passes through the fluid resistance from the in-valve space and flows out to the outside, or the fluid passes through the fluid resistance from the outside and flows into the in-valve space. Accordingly, the fluid resistance does not occupy the inner space inside the fluid control valve such as the channel, and the internal volume of the in-valve space and the like can be reduced.

In addition, since the fluid resistance is clamped by the pair of clamping members, the fluid resistance can be fixed inside the fluid control valve even if the fluid resistance is made thin. As a result, the in-valve space can be further reduced in volume.

In this manner, with the fluid control valve according to the present invention, it is possible to omit a channel which is conventionally necessary for connecting the fluid control valve and the fluid resistance, and the internal volume of the in-valve space can be reduced even with the fluid resistance being provided inside the fluid control valve. Accordingly, it is possible to minimize the amount of fluid that remains in the in-valve space when the valve body closes the valve seat portion, and thus the falling response performance can be improved in the case of applying the fluid control valve according to the present invention to pressure control or flow rate control.

In order to carry out the pressure control or the flow rate control by providing only a single fluid control valve in the channel, it is preferable to provide a pressure sensor that measures a pressure of the fluid in the in-valve space.

To reduce the internal volume of the in-valve space as much as possible so as to improve the falling responsiveness, the fluid resistance may be formed in a planar shape, and the pair of clamping members may clamp the fluid resistance with each clamping member being in contact with either one of planar face parts of the fluid resistance.

A specific example of a configuration for reducing the internal volume of the in-valve space while employing an arrangement essential for the fluid control valve may be as follows. One of the pair of clamping members may be a valve seat block that is provided with an inner channel through which the fluid flows, and the valve seat portion may be formed around an outflow opening of the inner channel. The other one of the pair of clamping members may be an elastic member holding block which holds an elastic member that presses the valve body toward the valve seat portion. The fluid resistance valve may be clamped between the valve seat block and the elastic member holding block.

A specific example of configuration of the fluid control valve may be as follows, in which the fluid resistance are clamped between the pair of clamping members to be fixed at a predetermined position as constituent members for the fluid control valve are fixed. The fluid control valve may further include a valve seat block inside of which has an inner channel through which the fluid flows, and the valve seat portion may be formed around an outflow opening of the inner channel. The valve seat block may be configured such that the fluid resistance is clamped by the pair of clamping member as one of the pair of clamping members is pressed by the valve seat block.

A specific example of a configuration in order to allow the fluid resistance to be mounted at the final stage of an assembly process when assembling the fluid control valve and to facilitate, for example, an adjustment of the mounting position for the fluid resistance may be as follows. One of the pair of clamping members may be a valve seat block inside of which has an inner channel through which the fluid flows, and the valve seat portion may be formed around an inflow opening of the inner channel. The other one of the pair of clamping members may be a diaphragm structure that presses the valve body through the inner channel. The fluid resistance may be clamped between the valve seat block and the diaphragm structure.

In order to prevent the internal volume of the fluid control valve from increasing even when the pressure sensor is provided in addition to the fluid resistance, either one of the pair of clamping members may include a housing portion that houses the pressure sensor and a communication portion that allows the housing portion and the in-valve space to communicate with each other.

Advantageous Effects of Invention

In this manner, the fluid control valve according to the present invention is configured such that the fluid resistance is clamped by the pair of clamping members, which thus makes it possible to hold the fluid resistance while reducing the thickness of the fluid resistance. In addition, the fluid resistance and the pair of clamping members form the in-valve space in which the valve body or at least part of the actuation member that moves the valve body is housed. The fluid passes through the fluid resistance from the in-valve space and flows out to the outside, or the fluid passes through the fluid resistance from the outside and flows into the in-valve space. Thus, the fluid resistance can serve as an outer wall for defining the in-valve space, and the internal volume in the fluid control valve is not occupied by the fluid resistance. Accordingly, the internal volume of the fluid control valve can be reduced as much as possible, thereby making it possible to improve, for example, the falling responsiveness. In addition, unlike a conventional technique, there is no need to provide a channel for connecting the respective instruments that are separately provided, thereby totally eliminating a problem that an unintended pressure loss occurs when each channel is made too narrow and short.

REFERENCE SIGNS LIST a. 100 Fluid control valve
b. H Pair of clamping members
c. 4 Valve body
d. 5 Fluid resistance
e. 6 Valve seat block
f. 61 Valve seat portion
g. S2 Downstream-side in-valve space (in-valve space)

DESCRIPTION OF EMBODIMENTS

Figure 1:
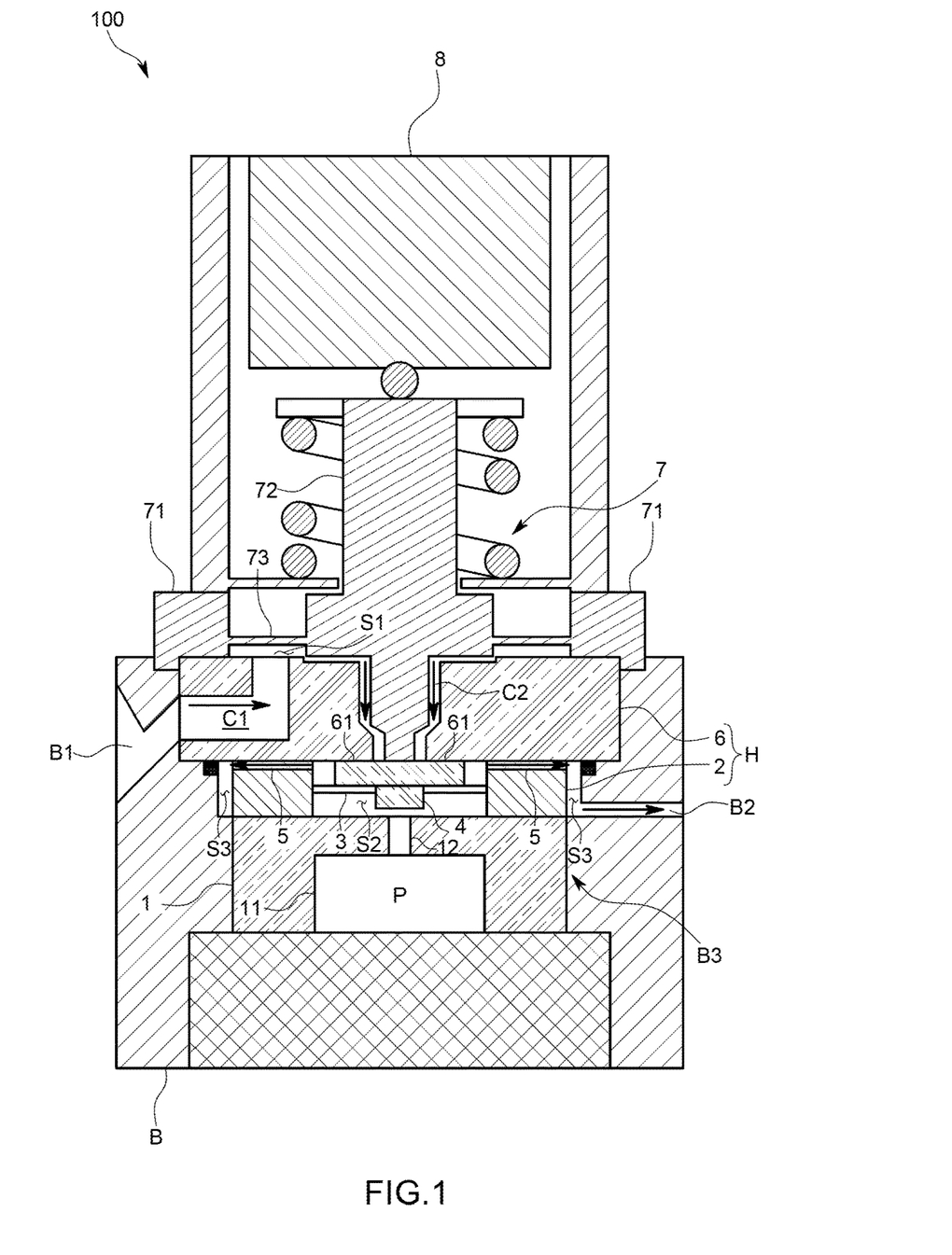
FIG. 1 is a schematic sectional view illustrating a fluid control valve according to a first embodiment of the present invention.

A fluid control valve 100 according to a first embodiment of the present invention will be described with reference to FIG. 1. Arrows indicated in channels and other portions in each drawing show the flow of fluid.

The fluid control valve 100 is used, for example, to control a flow rate of fluid, such as a reactant gas and a component gas, in a semiconductor fabrication process. The fluid control valve 100 according to the first embodiment is configured to control the flow rate of fluid with providing only a single fluid control valve 100 in a channel.

The fluid control valve 100 is assembled by stacking each member in a housing recess portion B3 formed in a generally rectangular parallelepiped block body B. An inflow channel B1 for allowing fluid to flow into the housing recess portion B3 and an outflow channel B2 for allowing fluid to flow out of the housing recess portion B3 are formed in the block body B.

The fluid control valve 100 is assembled with a sensor holding block 1, an elastic member holding block 2, a leaf spring 3 (elastic member), a valve body 4, a fluid resistance 5, a valve seat block 6, a diaphragm structure 7, and a piezoelectric stack 8, which are stacked in this order from a bottom face side of the housing recess portion B3, in a state in which the fluid control valve 100 is mounted in the block body B. In the first embodiment, the fluid resistance 5 is clamped by the valve seat block 6 and the elastic member holding block 2, which constitute a pair of clamping members H, and a downstream-side in-valve space S2 serving as an in-valve space in which the valve body 4 is housed, is formed by the fluid resistance 5 and the pair of clamping members H on the downstream side of the valve body 4. In addition, an upstream-side in-valve space S1 is formed by the valve seat block 6 and the diaphragm structure 7 on the upstream side of the valve body 4.

Specifically, the fluid that has flowed into the fluid control valve 100 through the inflow channel B1 passes between the valve seat block 6 and the valve body 4 from the upstream-side in-valve space S1 and flows into the downstream-side in-valve space S2. Then, the fluid that has flowed into the downstream-side in-valve space S2 passes through the fluid resistance 5, flows out to a valve-exterior space S3 formed between an outer peripheral face of the elastic member holding block 2 and the housing recess portion B3, and finally flows into the outflow channel B2.

Each part will be described in detail.

The sensor holding block 1 is formed in a generally cylindrical shape and holds a pressure sensor P for measuring a pressure of fluid in the downstream-side in-valve space S2. The sensor holding block 1 has a housing portion 11 in which the pressure sensor P is housed and a communication portion 12 that allows the housing portion 11 and the downstream-side in-valve space S2 to communicate with each other.

The elastic member holding block 2 is formed in a generally thick cylindrical shape having an outer diameter larger than its height and holds, in a space on its inner peripheral side, the leaf spring 3 that presses the valve body 4 toward the valve seat block 6. The outer diameter of the elastic member holding block 2 is slightly smaller than the inner diameter of the housing recess portion B3, and the valve-exterior space S3 that communicates with the outflow channel B2 is formed between the elastic member holding block 2 and the housing recess portion B3.

The fluid resistance 5 is a restrictor ring formed in a flat ring shape having an outer diameter and an inner diameter that are substantially the same as those of the elastic member holding block 2. The fluid resistance 5 is formed by stacked thin plates and a number of fine channels are formed in the fluid resistance in its radial direction. Specifically, the fluid resistance 5 is configured such that, when fluid passes therethrough, the fluid flows in a laminar flow state, which produces a pressure difference between the downstream-side in-valve space S2 and the valve-exterior space S3. The fluid resistance 5 is configured such that only the inner peripheral face and the outer peripheral face thereof are exposed to the outside with its respective planar face parts being pressed and clamped by the elastic member holding block 2 and the valve seat block 6, which constitute the pair of clamping members H. Accordingly, as the thickness of the fluid resistance 5 is reduced, the volume of the downstream-side in-valve space S2 can be reduced.

The valve seat block 6 is formed in a generally cylindrical shape and has two inner channels formed therein. At the bottom face of the valve seat block 6, a valve seat portion 61 is formed, which makes contact with the valve body 4. More specifically, the valve seat block 6 includes a first inner channel C1 having an L-shaped cross section which opens toward an outer side face communicating with the inflow channel B1 and toward an upper face, and a second inner channel C2 which penetrates through the upper face and the bottom face. The valve seat portion 61 is formed in the vicinity of the outflow opening of the second inner channel C2. In other words, the fluid that flows in from the inflow channel B1 flows from the outer side face toward the upper face of the valve seat block 6 and then flows from the upper face side toward the bottom face side, where the valve seat portion 61 is located. The valve body 4 is capable of making or breaking contact with the valve seat portion 61, and the opening of the fluid control valve 100 is adjusted by changing the distance between the valve seat portion 61 and the valve body 4.

The diaphragm structure 7 provides a tight seal at the upper face side of the valve seat block 6 to form the upstream-side in-valve space S1. The diaphragm structure 7 includes a generally ring-shaped fixing portion 71 that is fixed to the block body B, a plunger portion 72 that serves as an actuation member for pressing the valve body 4 through the second inner channel C2 so as to move the valve body 4, and a diaphragm 73 that serves as a membranous portion connecting between the fixing portion 71 and the plunger portion 72. As the fixing portion 71 is tightened into the block body B by screws, the members underneath the diaphragm structure 7 are pressed toward the bottom face of the housing recess portion B3, and the fluid resistance 5 is fixed at a predetermined position by the pair of clamping members H.

The piezoelectric stack 8 has its amount of expansion and contraction controlled in accordance with a voltage applied thereto. The piezoelectric stack 8 presses the end portion of the plunger portion 72 that is opposite to where the valve body 4 is provided and thus controls the position of the valve body 4.

Subsequently, a case in which the flow rate of fluid is controlled by using only the fluid control valve 100 will be described.

The opening of the fluid control valve 100 which corresponds to the distance between the valve seat portion 61 and the valve body 4, is controlled on the basis of a deviation of a measured flow rate of the fluid that is measured on the basis of a pressure in the downstream-side in-valve space S2 measured by the pressure sensor P from a set flow rate set by a user.

More specifically, if the outflow channel B2 is connected to a chamber that is kept in a substantially vacuum state, the measured flow rate of the fluid can be calculated, for example, by multiplying a square of the pressure in the downstream-side in-valve space S2 located on the upstream side of the fluid resistance 5 by a predetermined coefficient.

Therefore, since the measured flow rate is calculated from the pressure measured by the pressure sensor P that is included in the fluid control valve 100, it is possible to constitute a flow rate control device only by providing the fluid control valve 100 in a channel if a computer or the like is used as an opening control unit (not illustrated) for controlling a voltage to be applied to the piezoelectric stack 8 so as to reduce the deviation of the measured flow rate from the set flow rate.

As described thus far, since the fluid control valve 100 includes the fluid resistance 5 and the pressure sensor P for measuring the pressure of the fluid in the downstream-side in-valve space S2, there is no need to additionally provide the fluid resistance 5 and the pressure sensor P in a channel as in a conventional technique, when constituting a flow rate control device, for example. Since it is only required that the fluid control valve 100 be provided in the channel, there is no need to form a channel for connecting respective instruments. As a result, it is possible to reduce the internal volume by a volume corresponding to the channel that is conventionally needed for constituting a flow rate control device.

Furthermore, since the downstream-side in-valve space S2 located on the downstream side of the valve body 4 is defined by the pair of clamping members H, the fluid resistance 5 can be disposed at an outlet of the channel in the fluid control valve 100. The fluid resistance 5 is formed in a flat ring shape and clamped by the pair of clamping members H, and thus the volume of the downstream-side in-valve space S2 can also be reduced. In other words, the internal volume of the fluid control valve 100 can be reduced even with the fluid control valve 100 being provided with the fluid resistance 5.

Furthermore, the pressure sensor P is housed in the sensor holding block 1 and can measure the pressure in the downstream-side in-valve space S2 via the communication portion 12, and thus an increase in the internal volume can be also prevented by providing the pressure sensor P.

For the reasons as discussed above, with regard to the fluid control valve 100 alone, its internal volume can be reduced when compared with a conventional fluid control valve.

Accordingly, with the fluid control valve 100 according to the first embodiment, a flow rate control device with a very small internal volume can be realized, which makes it possible to shorten the falling time from the opening is zero till the flow rate becomes actually zero. In other words, the control accuracy, such as the falling response performance, can be improved by the fluid control valve 100.

In addition, separate members, such as a pressure sensor P and a fluid resistance, are not required for constituting a flow rate control device, and thus the cost for components for constituting the flow rate control device can also be reduced.

Figure 2:
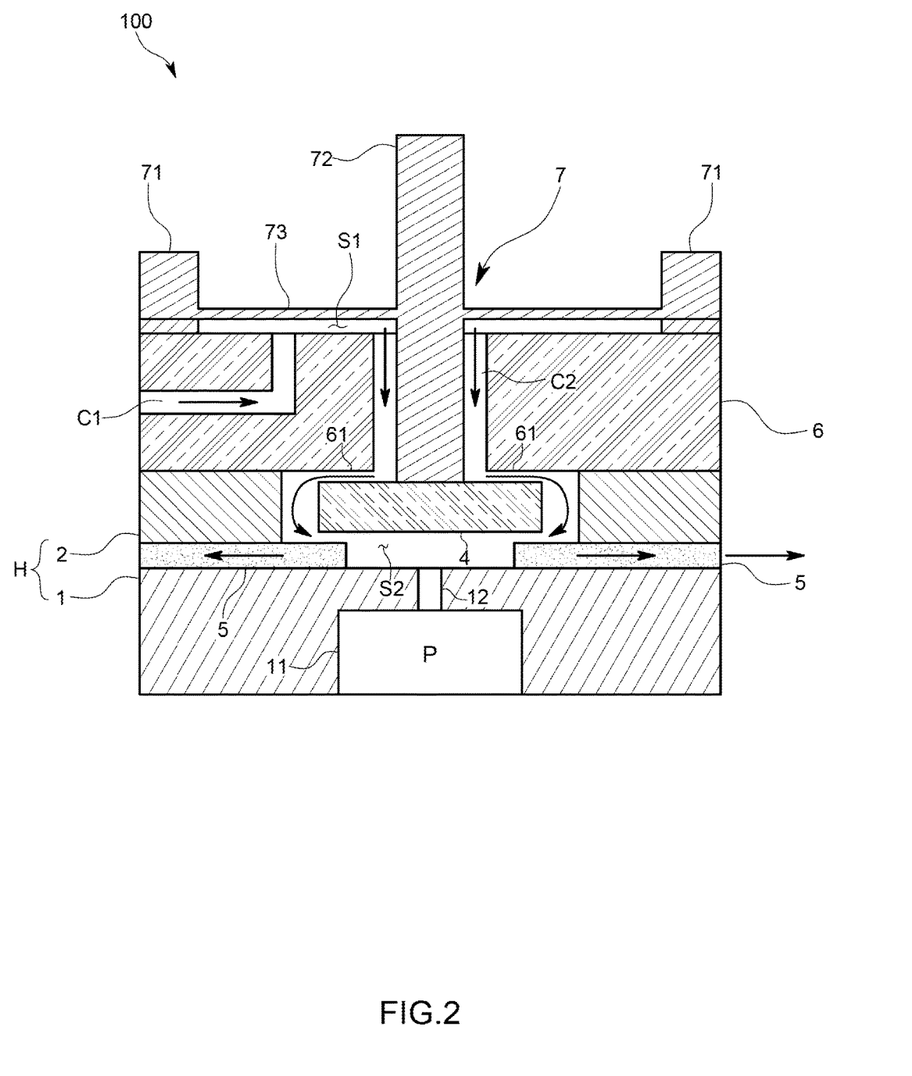
FIG. 2 is a schematic sectional view illustrating a fluid control valve according to a second embodiment of the present invention.

Subsequently, a fluid control valve 100 according to a second embodiment will be described with reference to FIG. 2. It is to be noted that members that are common to those of the first embodiment are given identical reference characters.

The fluid control valve 100 according to the second embodiment differs from the first embodiment in that the fluid resistance 5 is clamped between the elastic member holding block 2 and the sensor holding block 1, whereas the fluid resistance 5 is clamped between the valve seat block 6 and the elastic member holding block 2 in the first embodiment. In other words, the pair of clamping members H is constituted by the elastic member holding block 2 and the sensor holding block 1 in the second embodiment, whereas the pair of clamping members H is constituted by the valve seat block 6 and the elastic member holding block 2 in the first embodiment. In the second embodiment as well, the downstream-side in-valve space S2 formed by the pair of clamping members H and the fluid resistance 5 corresponds to the in-valve space in which the valve body 4 is housed, and the fluid passes through the fluid resistance 5 from the downstream-side in-valve space and flows out to the outside of the fluid control valve 100.

The fluid resistance 5 is formed in a flat ring shape having an inner diameter smaller than that of the elastic member holding block 2.

Even with such a fluid control valve 100 according to the second embodiment, the internal volume can be reduced and the falling response performance can be improved, as in the fluid control valve 100 according to the first embodiment.

Figure 3:
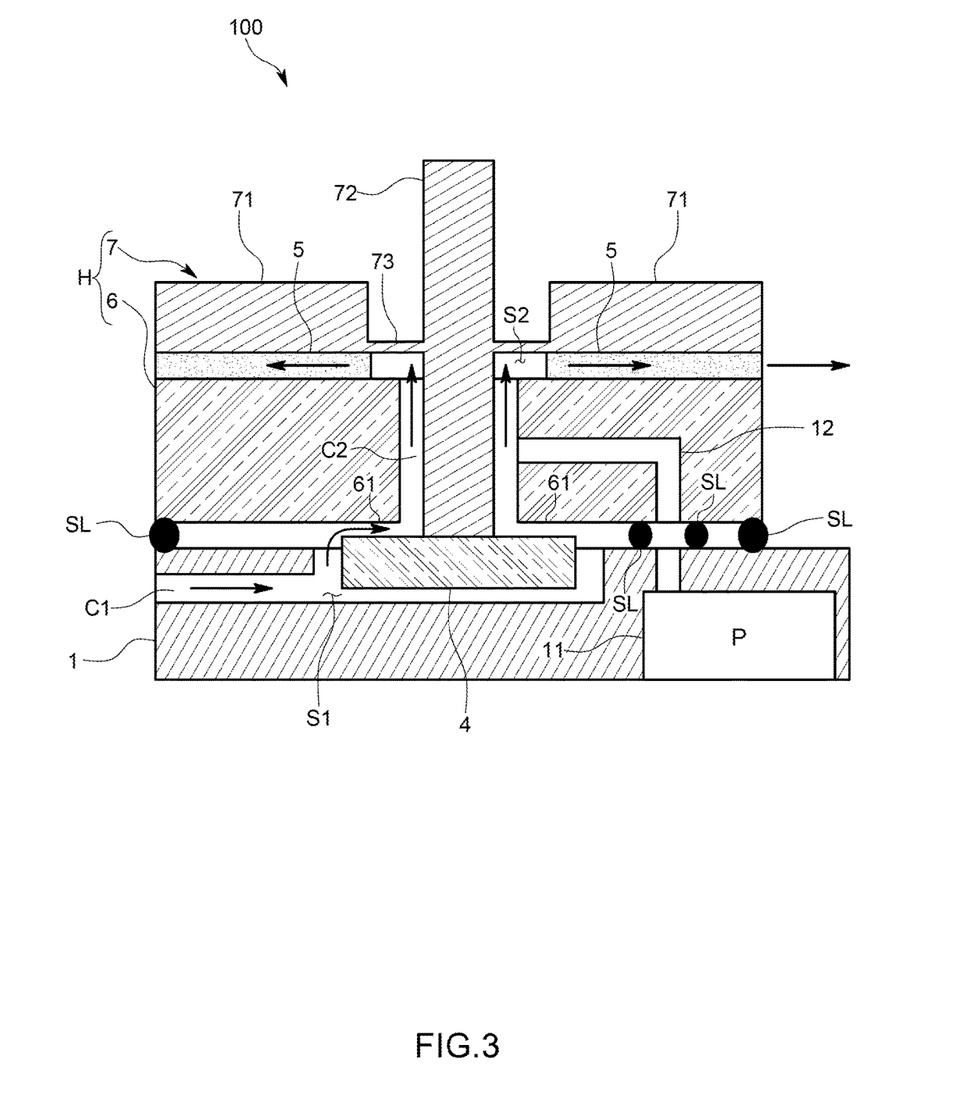
FIG. 3 is a schematic sectional view illustrating a fluid control valve according to a third embodiment of the present invention.

Subsequently, a fluid control valve 100 according to a third embodiment will be described with reference to FIG. 3. It is to be noted that members that are common to those of the first embodiment are given identical reference characters.

The fluid control valve 100 according to the third embodiment is configured such that the fluid flows from the lower side to the upper side, whereas the fluid control valve 100 according to the first embodiment is configured such that the fluid flows from the upper side to the lower side. In the fluid control valve 100 of the third embodiment, because the direction of flow is reversed, the fluid resistance 5 is clamped between the valve seat block 6 and the diaphragm structure 7 so as to form the downstream-side in-valve space S2 on the downstream side of the valve body 4. In other words, the downstream-side in-valve space S2 is defined by the valve seat block 6, the fluid resistance 5, and the diaphragm structure 7, and at least a portion of the plunger portion 72, which serves as the actuation member for moving the valve body 4, is housed in the downstream-side in-valve space S2 in the third embodiment.

In addition, in the third embodiment, since the sensor holding block 1 can serve the function of the elastic member holding block 2, the elastic member holding block 2 is omitted.

Specifically, the fluid control valve 100 according to the third embodiment are provided with the sensor holding block 1, the valve body 4, the valve seat block 6, the fluid resistance 5, and the diaphragm structure 7 in this order from the bottom face side in a state in which the fluid control valve 100 is mounted in the housing recess portion B3.

The sensor holding block 1 has the first inner channel C1 that is connected to the inflow channel B1, and the first inner channel C1 communicates with the second inner channel C2 that penetrates through the upper face and the bottom face of the valve seat block 6.

The valve seat block 6 has a communication portion 12 that opens toward the second inner channel C2 and communicates with the housing portion 11 of the sensor holding block 1 in which the pressure sensor P is housed. Between the upper face of the sensor holding block 1 and the bottom face of the valve seat block 6, sealing members SL are provided at positions around the bottom-face-side opening of the communication portion 12 in the valve seat block 6 and at outermost peripheral portion of the valve seat block 6 so as to provide a partition between the inflow opening of the second inner channel and the communication portion 12.

With such a fluid control valve 100 according to the third embodiment, the internal volume can be reduced and the falling response performance can be improved as well, while vertically reversing the flow of the fluid from that of the first embodiment.

Other embodiments will be described.

Although the fluid control valve includes the pressure sensor in addition to the fluid resistance in each of the above-described embodiments, the pressure sensor may be omitted, and the fluid control valve provided with only the fluid resistance may be employed, for example. In addition, although a specific example for applying the fluid control valve to the flow rate control device is illustrated, the fluid control valve according to the present invention may be used for constituting a pressure control device, for example.

Furthermore, the fluid control valve may be configured to include two pressure sensors and measure the pressure of fluid on the upstream and downstream sides of the fluid resistance in order to more accurately measure the flow rate. By this way, the flow rate can be measured accurately regardless of the pressure on the downstream side, so that a mass flow controller may be configured by providing only a fluid control valve for controlling a mass flow rate or a volume flow rate of the fluid.

In addition, it is not absolutely necessary that the pressure sensor be housed in the sensor holding block, but the pressure sensor may be housed in another member such that the pressure sensor can measure the pressure in the downstream-side in-valve space.

A specific example of the fluid resistance is not limited to a restrictor ring, but may be another type of laminar flow element, a sonic nozzle, or the like, as long as the fluid resistance is provided in the fluid control valve in a state of being clamped by the pair of clamping members. In addition, if the fluid resistance is formed in a planar shape as in each of the embodiments and the fluid resistance is fixed with its respective planar face parts being pressed by the clamping members, the fluid resistance can be fixed at a designed position and a pressure drop can be produced as it is designed.

Although a fluid control valve of a normal close type is illustrated in each of the above-described embodiments, the present invention can be applied to a fluid control valve of a normal open type as well. The fluid resistance may be clamped by a combination of members other than the pair of clamping members as illustrated in each of the above-described embodiments.

Although each of the above-described embodiments illustrates the fluid control valve in which the fluid passes through the fluid resistance from the in-valve space and flows out to the outside, it may be configured such that the fluid passes through the fluid resistance from the outside and flows into the in-valve space. In other words, it may be configured such that the space is formed on the upstream side of the valve body as an upstream-side in-valve space, which is formed by the pair of clamping members and the fluid resistance to contain the valve body or at least part of the actuation member that moves the valve body. Even with such a configuration, an effect similar to that of each of the above-described embodiments can be achieved.

Furthermore, the construction and the method for providing the fluid resistance and the pressure sensor, as illustrated in the present specification, are not limited to be applied to the fluid control valve, but may be applied to other fluid instruments. In other words, any configuration may be used as long as the above-described construction is provided inside a fluid instrument and includes a fluid resistance that forms an inner space, a communication passage that communicates with the inner space formed by the fluid resistance in the fluid instrument, and a pressure sensor that measures a pressure in the inner space via the communication passage. In order to reduce the volume of the inner space as much as possible, it is preferable that the fluid resistance is clamped and fixed by the pair of clamping members constituting the fluid instrument, the pressure sensor is provided inside of a member constituting the fluid instrument, and the communication passage is provided so as to allow communication between the pressure sensor and the inner space. With such a configuration, it is possible to provide the fluid resistance and the pressure sensor in a fluid instrument even if the fluid instrument is provided at a location apart from the fluid resistance and the pressure sensor as in the conventional arrangement. As a result, a channel for connecting respective instruments becomes unnecessary, the internal volume can be reduced, and the responsiveness in the measurement and the control can be improved.

Additionally, various modifications and combinations of the embodiments may be made without departing from the spirit of the present invention.

INDUSTRIAL APPLICABILITY

According to the fluid control valve of the present invention, the internal volume can be reduced as much as possible, which makes it possible to realize a fluid control device with improved falling responsiveness in pressure control and flow rate control, for example.

The invention claimed is:

1. A fluid control valve, comprising:
   a valve seat portion;
   a valve body capable of making or breaking contact with the valve seat portion by moving in a movement direction, wherein, in a condition of breaking contact, the valve body in its entirety is displaced from being in contact with the valve seat portion;
   a fluid resistance; and
   an upstream-side clamping member and a downstream-side clamping member that together comprise a pair of clamping members that clamps the fluid resistance,
   wherein the fluid resistance and at least one of the upstream-side clamping member and the downstream-side clamping member enclose an in-valve space in which the valve body or at least part of an actuation member that moves the valve body is housed,
   wherein fluid passing through a space between the valve seat portion and the valve body passes through the fluid resistance from the in-valve space and flows outside of the fluid control valve, or the fluid passes through the fluid resistance from outside of the fluid control valve and flows into the in-valve space, and
   wherein the pair of clamping members clamps the fluid resistance along the movement direction of the valve body.

2. The fluid control valve according to claim 1, further comprising:
   a pressure sensor that measures a pressure of the fluid in the in-valve space.

3. The fluid control valve according to claim 2,
   wherein either of the pair of clamping members includes a housing portion that houses the pressure sensor and a communication portion that allows the housing portion to communicate with the in-valve space.

4. The fluid control valve according to claim 1,
   wherein the fluid resistance is formed in a planar shape, and
   wherein the pair of clamping members clamps the fluid resistance with each clamping member being in contact with either one of planar face parts of the fluid resistance.

5. The fluid control valve according to claim 1,
   wherein the upstream-side clamping member is a valve seat block that has an inner channel through which the fluid flows, and the valve seat portion is formed around an outflow opening of the inner channel,
   wherein the downstream-side clamping member is an elastic member holding block that holds an elastic member that presses the valve body toward the valve seat portion, and
   wherein the fluid resistance is clamped between the valve seat block and the elastic member holding block.

6. The fluid control valve according to claim 1, further comprising:

a valve seat block that is provided with an inner channel through which the fluid flows, and the valve seat portion is formed around an outflow opening of the inner channel, wherein the valve seat block is configured to press the upstream-side clamping member to thereby clamp the fluid resistance by the pair of clamping members.

7. The fluid control valve according to claim 1, wherein the upstream-side clamping member is a valve seat block that has an inner channel through which the fluid flows, and the valve seat portion is formed around an inflow opening of the inner channel, wherein the downstream-side clamping member is a diaphragm structure that presses the valve body through the inner channel, and wherein the fluid resistance is clamped between the valve seat block and the diaphragm structure.

* * * * *